United States Patent
Stavely et al.

(10) Patent No.: US 7,397,968 B2
(45) Date of Patent: Jul. 8, 2008

(54) SYSTEM AND METHOD FOR TONE COMPOSITION

(75) Inventors: Donald J. Stavely, Windsor, CO (US); Amy E. Battles, Windsor, CO (US); Sarah J. Barrios, Fort Collins, CO (US); Kenneth R. Stockton, Fort Collins, CO (US); Kathy Louise Miner, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 640 days.

(21) Appl. No.: 10/696,328

(22) Filed: Oct. 29, 2003

(65) Prior Publication Data

US 2005/0094891 A1 May 5, 2005

(51) Int. Cl.
*G06K 9/40* (2006.01)
*G06K 9/48* (2006.01)
*H04N 5/222* (2006.01)

(52) U.S. Cl. .............. 382/274; 382/266; 382/199; 348/333.01

(58) Field of Classification Search ............ 382/266, 382/274, 199; 348/333
See application file for complete search history.

(56) References Cited

U.S. PATENT DOCUMENTS

| | | | |
|---|---|---|---|
| 3,539,696 A * | 11/1970 | Sweeney et al. | 434/43 |
| 4,655,576 A * | 4/1987 | Yuasa et al. | 396/157 |
| 4,958,182 A * | 9/1990 | Froberg et al. | 396/292 |
| 5,181,234 A * | 1/1993 | Smith | 378/87 |
| 5,706,049 A * | 1/1998 | Moghadam et al. | 348/333.03 |
| 5,710,877 A | 1/1998 | Marimont et al. | |
| 5,751,852 A | 5/1998 | Marimont et al. | |
| 5,809,179 A | 9/1998 | Marimont et al. | |
| 5,825,910 A * | 10/1998 | Vafai | 382/132 |
| 5,974,165 A * | 10/1999 | Giger et al. | 382/132 |
| 5,999,658 A | 12/1999 | Shimazu et al. | |
| 6,160,916 A | 12/2000 | Horiuchi | |
| 6,215,561 B1 | 4/2001 | Kakutani | |
| 6,246,745 B1 * | 6/2001 | Bi et al. | 378/54 |
| 6,480,300 B1 | 11/2002 | Aoyama | |
| 6,970,199 B2 * | 11/2005 | Venturino et al. | 348/333.02 |
| 7,034,881 B1 * | 4/2006 | Hyodo et al. | 348/333.12 |
| 2002/0044122 A1 | 4/2002 | Kuwata et al. | |
| 2002/0159652 A1 | 10/2002 | Izume et al. | |
| 2003/0053689 A1 | 3/2003 | Watanabe et al. | |
| 2003/0153839 A1 * | 8/2003 | Nomura | 600/492 |
| 2005/0088542 A1 * | 4/2005 | Stavely et al. | 348/239 |
| 2006/0204057 A1 * | 9/2006 | Steinberg | 382/118 |

FOREIGN PATENT DOCUMENTS

JP      01128052 A   *   5/1989    .............. 396/233

OTHER PUBLICATIONS

Shiffmann, S.—"Medical Image Segmentation Using Analysis of Isolable-Contour Maps"—IEEE Transactions on Medical Imaging—vol. 19 No. 11—Nov. 2000.*

* cited by examiner

*Primary Examiner*—Jingge Wu
*Assistant Examiner*—Bernard Krasnic

(57) ABSTRACT

A system and method for assisting in tone composition that comprises receiving light information corresponding to light detected by a plurality of pixels, analyzing the light information to determine a light value for each of the plurality of pixels, determining contour information, the contour information corresponding to a plurality of groups of adjacent pixels, wherein each group of adjacent pixels is characterized by a unique predetermined range of light values, and communicating the contour information to a display.

16 Claims, 4 Drawing Sheets

SYSTEM AND METHOD FOR TONE COMPOSITION

TECHNICAL FIELD

The present invention is generally related to image capture devices and, more particularly, is related to a system and method for assisting in the composition of the tone of captured images.

BACKGROUND

Composition of a captured image may be difficult for some users of image capture devices. In addition to lighting, focus, focal length and field-of-view issues, the user must also consider the exposure of the image, referred to hereinafter as tone composition, so that all objects in the image have adequate discernable detail. That is, do the objects of interest and/or the background objects of the captured image have tone composition that is in an interesting and visually pleasing manner? Less than optimal tone composition in a captured image results in portions of the image being overexposed, discernable as very bright or white regions with little visible detail, and/or portions of the image being underexposed, discernable as very dark or black regions with little visible detail.

Images that exhibit a wide range of tones, referred to as high contrast images, are difficult to capture without undesirable overexposed or underexposed regions since the lighting conditions over the frame of the captured image varies over a large range. The exposure of the image is based upon determining a desirable exposure for the primary object of interest in the frame. Accordingly, when the primary object of interest is captured, details of the primary object of interest are discernible. However, when the image is captured in a high contrast image, other objects may be overexposed or underexposed because the exposure has not been optimized for the lighting conditions of these objects, resulting in less discernable detail for these objects.

Ideally, this condition would be noticed by the user, either before the image is taken, or immediately after, allowing another adjusted image to be captured. Digital cameras typically provide a display that provides a preview of the image to be captured and postview of the captured image. However, the displayed image quality and/or resolution on these displays is often inadequate for distinguishing highlight and shadow detail. Such displays may have a very limited contrast range. In addition, some viewing conditions in the field make it difficult to critically evaluate a displayed image since ambient lighting conditions interfere with image viewing. For example, even if the display was capable of displaying images with very high contrast, glare from the scene may limit the discernable contrast of the viewed image.

FIG. 1A is a simplified exemplary high contrast captured image 102 of a scenic mountain 104, with a deer 106 and a tree 108 in the foreground, and clouds 110 in the background. Assuming it is a bright day, the high contrast image 102 shows the clouds as very bright and white, with a more desirable contrast for the deer 106 and tree 108 in the foreground. The image 102 is, to some, not a visually pleasing image because the clouds 110 have little discernable detail, and accordingly, may not be interesting to the viewer. Since the exposure is optimized for the primary objects of interest of the image 102, the scenic mountain 104 with the deer 106 and the tree 108 in the foreground, exposure cannot be optimal for the clouds 110. Accordingly, the clouds 110 are washed out, or overexposed, in the image 102 when captured.

FIG. 1B is a simplified exemplary high contrast captured image 112 of a woman 114. A barely visible picture 116 is in the background of image 112. The image 112 is, to some, not a visually pleasing image because the picture 116 is not visible in the background of the image 112. Since the image 112 was captured indoors under artificial lighting conditions without a flash to provide supplemental lighting to the background, the upper left-hand corner of image 112 appears as a black region 118. That is, the black region is underexposed since there is very little to no lighting of that area, relative to the amount of light detected from the object of interest, the woman 114. Similarly, the gray region 120 illustrates another relatively underexposed area (a heavily shaded area) of the background. The underexposed gray region 120 provides for limited visibility of the left-hand side of image 112. However, underexposed background objects such as the picture 116 are not easily discernible by a viewer.

In the image 102, the clouds 110 are very bright, relative to the scenic mountain 104 with the deer 106 and the tree 108 in the foreground. Accordingly, when the image 102 is captured with the deer 106 and tree 108 set at a middle gray tone setting, the clouds 110 are overexposed. That is, when the image 102 is captured, the pixels of a photoelement array that are detecting light from the clouds 110 become saturated, and thereby record the clouds 110 as being very bright and white.

Similarly, in the image 112, the background area of the image where the picture 116 resides is dark, relative to the image of the woman 114. Accordingly, when the image 112 is captured with the woman 114 set at a middle gray tone setting, the background area where the picture 116 resides is underexposed. That is, when the image 112 is captured, the pixels of a photoelement array that are detecting light from picture 116 and the left-hand side of the image 112 detect relatively little light, and thereby record the picture 116 as being black or shaded. It is therefore desirable to assist a user of a digital camera in composing tone aspects of an image to be captured and/or later processed.

SUMMARY

The present invention provides a system and method for assisting in tone composition of an image. Briefly described, one embodiment comprises receiving light information corresponding to light detected by a plurality of pixels, analyzing the light information to determine a light value for each of the plurality of pixels, determining contour information, the contour information corresponding to a plurality of groups of adjacent pixels, wherein each group of adjacent pixels is characterized by a unique predetermined range of light values, and communicating the contour information to a display.

Another embodiment comprises a photosensor comprising a plurality of pixels that detect light; a processor that receives light information from the pixels, that analyzes the light information to determine a light value for each of the plurality of pixels and that determines contour information, the contour information corresponding to a plurality of groups of adjacent pixels, wherein each group of adjacent pixels is characterized by a unique predetermined range of light values; and a display configured to display the contour information and a preview image.

BRIEF DESCRIPTION OF THE DRAWINGS

The components in the drawings are not necessarily to scale relative to each other. Like reference numerals designate corresponding parts throughout the several views.

DETAILED DESCRIPTION

Figure 1A:
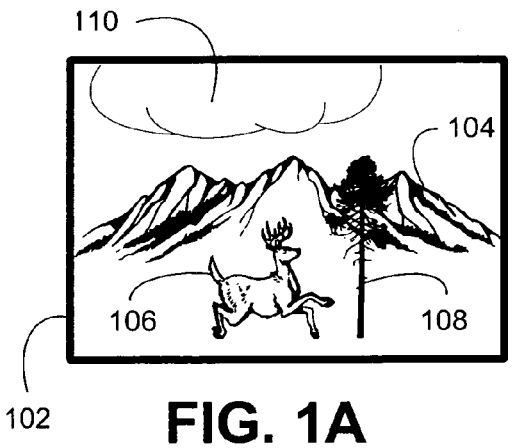
FIG. 1A is a simplified exemplary high contrast captured image of a scenic mountain with a deer and tree in the foreground.

Embodiments are related to a system and method for assisting a user in the composition of the tone of captured images. An embodiment of the tone contour system 400 (FIG. 4) automatically determines contour information of a preview image that is to be captured, and based upon that determination, displays contour information concurrently with a preview image. Contour information corresponds to tone characteristics of the framed image before image capture. The contour information is determined by analyzing the image detected by the digital camera before image capture, referred to herein as a "preview image" for convenience. Accordingly, the user is assisted in composing tone (exposure) of the image by understanding which portions of the preview image may be overexposed and/or underexposed if the image is captured.

When the contour information, such as tone contour lines, are displayed concurrently with a preview image before image capture, the user understands that portions of the image, when captured, may be overexposed and/or underexposed. Tone contour lines indicate transitions between tone contour regions having similar exposure characteristics. One embodiment of the tone contour system 400 adjusts exposure for overexposed and/or underexposed pixels. In another embodiment, the user may adjust the tone composition of the image by specifying exposure changes. In yet another embodiment, the contour information is displayed concurrently with an image after image capture, such as on a personal computer (PC) or the like, so that a user may adjust the tone composition of the image at a later convenient time.

For convenience, tone characteristics of captured and preview images are described by tone values (zones) based upon the well known "zone system" which describes tone (exposure) using tone values ranging from the Roman numerals 0 through X. Overexposed objects, characterized by zone X, are viewed as completely white, with no gray shading. Zone IX shows objects having the first perceptible gray details on an otherwise white area. Underexposed objects, characterized by zone 0, are viewed as completely black, with no gray shading. Zone I shows objects having the first perceptible gray details on an otherwise black area.

Zone V is referred to as "middle gray." Middle gray corresponds to a light reflectance from the object at approximately eighteen percent (18%) of the incident light on the object. When an image is captured, the primary object(s) of interest in the captured image (or at least a portion thereof) will be captured at an exposure that substantially corresponds to zone V.

During image capture, a portion 418 of photosensor 410, or an exposure detector 412, (FIG. 4) detects light and determines the light intensity at a predefined area in the frame. The predetermined area may be a small portion of the image area in the case of "spot metering", and may be the whole area in the case of "average" or "area metering." Based upon the light detected portion 418 at the predefined point, or by the exposure detector 412, the image capture device 402 initially sets an exposure for all of the pixels of photosensor 410 such that when the pixels corresponding to the predefined point capture light, that portion of the captured image exhibits tone characteristics that substantially corresponds to zone V. That is, the exposure for the photosensor 410 is initially specified so that the pixels corresponding to the predefined point capture approximately 18% of the incident light reflecting from the object. In some more sophisticated image capture systems, the very light pixels and very dark pixels in the image are also analyzed, and the exposure is adjusted to limit or minimize the amount of the image that would be saturated (white) or lost in noise (black).

Figure 2A:
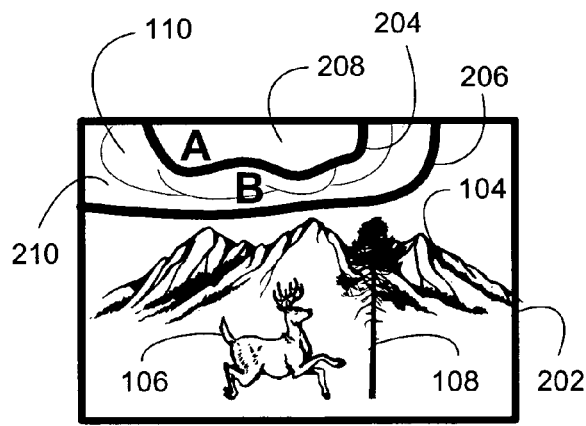
FIG. 2A is a simplified exemplary preview image with tone counter lines indicating regions having relatively high tone characteristics.
Figure 4:
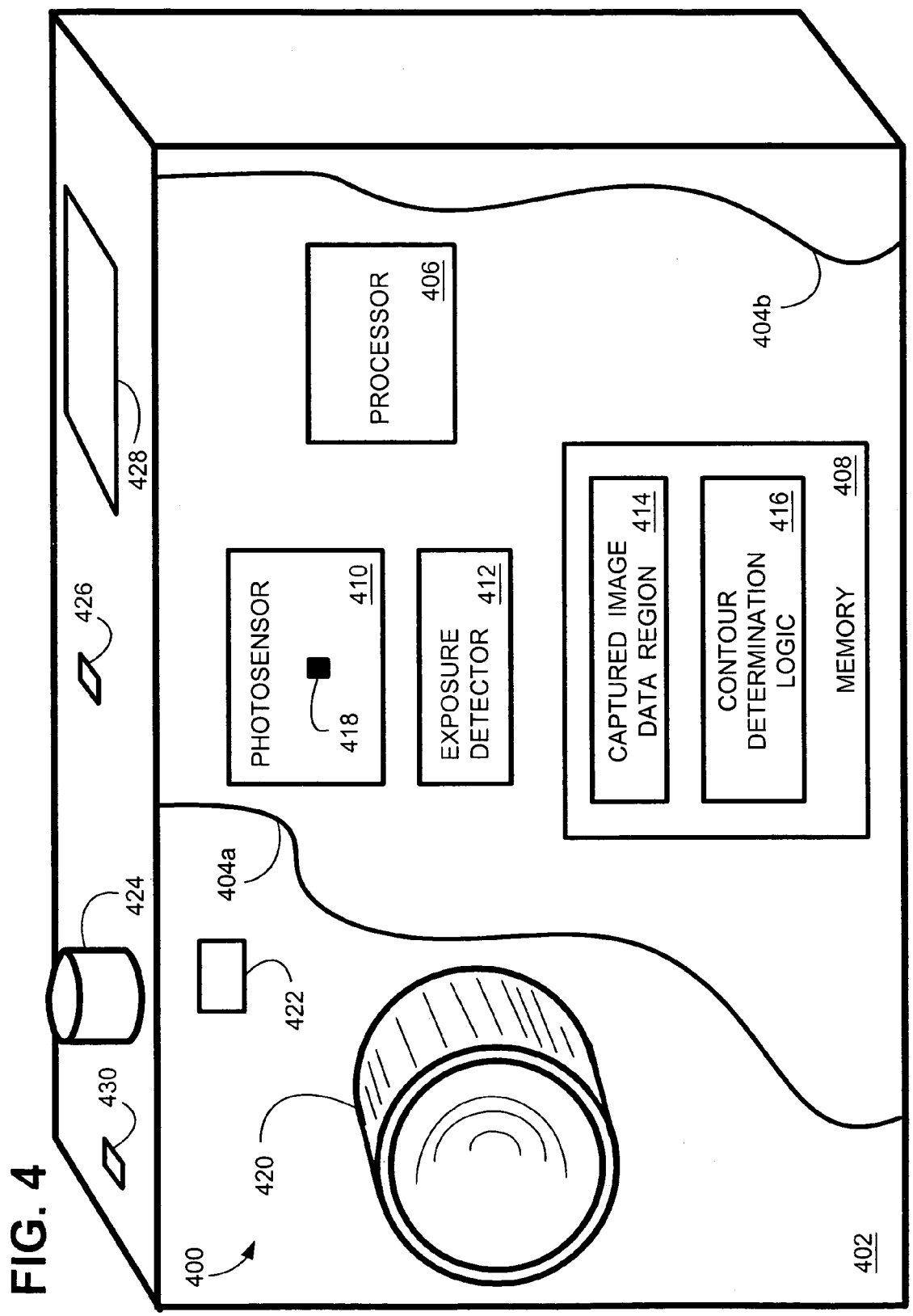
FIG. 4 is a block diagram illustrating an embodiment of a tone contour system implemented in an image capture device.

FIG. 2A is a simplified exemplary preview image 202 of a scenic mountain 104, with a deer 106 and tree 108 in the foreground, and clouds 110 in the background. Preview image 202 corresponds to a current image detected by the photosensor 410 of digital camera 402 (FIG. 4). Preview image 202 is displayed on display 428, and/or is viewable directly through viewfinder 422. The process of displaying the preview image 202 or viewing through the viewfinder 422 is described in greater detail hereinbelow.

As apparent in the preview image 202, capturing an image may not result in a visibly pleasing image to some viewers if clouds 110 are overexposed (thereby showing little detail of the clouds 110). When the image is captured, in the absence of an exposure adjustment by embodiments of the tone contour system 400, the clouds 110 will be overexposed (zones X-IX) since the primary objects of interest, the deer 106 and tree 108, are exposed at a middle gray tone setting.

Once the tone contour system 400 determines contour information of preview image 202, the contour information is communicated to the user. In one embodiment, contour information is displayed concurrently with preview image 202 as one or more lines indicating borders or transitions between portions of the preview image 202 characterized by different predefined exposure values or tone values. Such lines are referred to hereinafter as "tone contour lines." For example, in one embodiment, tone contour line 204 indicates a transition between a portion of the clouds 110 that are at zone X (as indicated by a completely white or washed out region) and a portion at zone IX (as indicated by barely discernable features of the clouds 110). Similarly, tone contour line 206 indicates a transition between the above-described portion of the clouds 110 that are at zone IX, and a portion of preview image 110 at zone VIII or lower (as indicated by the discernable features of the mountain 104).

In another embodiment, indicia are also displayed to further indicate regions of the preview image 202 that have similar tone characteristics, referred to hereinafter as "tone contour regions." In the simplified illustrative example of the preview image 202, the letter "A" indicates a tone contour region 208 corresponding to that portion of the preview image 202, when captured, that will be overexposed at zone X. The letter "B" indicates a tone contour region 210 corresponding to that portion of the preview image 202, when captured, that will be somewhat overexposed at zone IX. Any suitable indicia may be used, including roman numerals that correspond to the zone system.

Furthermore, tone contour regions may be shaded, textured and/or colored to further enhance the discernability of a tone contour region to the viewer. In one embodiment, the tone contour region corresponding to zone X (completely white due to overexposure) is indicated by coloring the tone contour region in red or in another suitable warning color. Other tone contour regions may be similarly colored with suitable warning colors.

Figure 2B:
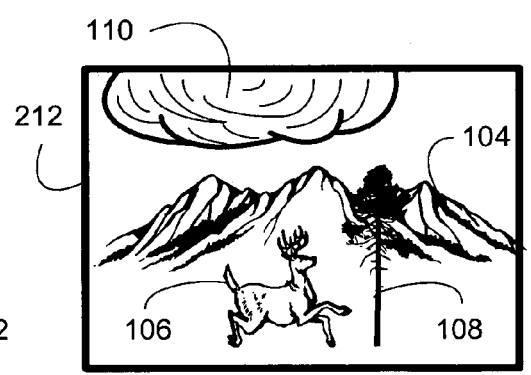
FIG. 2B is a simplified exemplary preview image of a scenic mountain with a deer and tree in the foreground after the user has adjusted tone characteristics of the image as suggested by the tone contour lines.

FIG. 2B is a simplified exemplary captured image 212 of the scenic mountain 104, with the deer 106 and tree 108 in the foreground, and clouds 110 in the background, after image exposure has been adjusted based upon the contour information provided by embodiments of the tone contour system 400. Accordingly, a captured image 212 displays the clouds 110 with a relative greater amount of detail than the clouds 110 in the preview image 202 (FIG. 2A).

In one embodiment, the user actuates the tone contour system 400 such that the exposure is automatically adjusted for those pixels corresponding to the identified tone contour regions to a more desirable exposure and/or to a predetermined exposure. For example, one embodiment adjusts exposure of the tone contour region 208 (zone X) to another predefined exposure corresponding to another zone, such as, but not limited to, zone IX. Exposure of tone contour region 210 (zone IX) is adjusted to another predefined zone, such as, but not limited to, zone VIII. Exposure of tone contour regions may also be adjusted to fractional zone values. In embodiments employing other tone indicia systems, the initial exposure, initial light value, initial zone and/or initial tone indicia is changed to an adjusted exposure, adjusted light value, adjusted zone and/or adjusted tone indicia, respectively.

Some embodiments of the tone contour system 400 automatically adjust exposure. In another embodiment, the user specifies the amount of adjustment to the initial tones, exposures, zones or other tone indicia for a tone contour region, thereby enabling the user to change exposure of portions of the photosensor 410 based upon user preferences. The specification of tone adjustments may be implemented via a menu system or by other suitable controllers. It is appreciated that the adjustment exposure for tone contour regions from an initial exposure, initial light value, initial zone and/or initial tone indicia to an adjusted exposure, adjusted light value, adjusted zone and/or adjusted tone indicia, respectively, is nearly limitless.

In one embodiment, after exposure of the preview image 202 has been adjusted as described above, an adjusted preview image is displayed. Accordingly, contour information is again determined based upon the adjusted tone exposure (and/or another exposure). The adjusted contour information, in the form of adjusted tone contour regions, tone contour lines, tone contour zone indicia, and/or other suitable indicia, is displayed concurrently with an adjusted preview image to indicate to the user the tone change that has been implemented by the tone contour system 400. For example, the adjusted preview image may appear similar to image 212 of FIG. 2B. Once the user is satisfied with the adjusted tone characteristics of the scenic mountain 104, deer 106, tree 108 and clouds 110, the user causes the digital camera 402 (FIG. 4) to capture image 212.

Figure 3A:
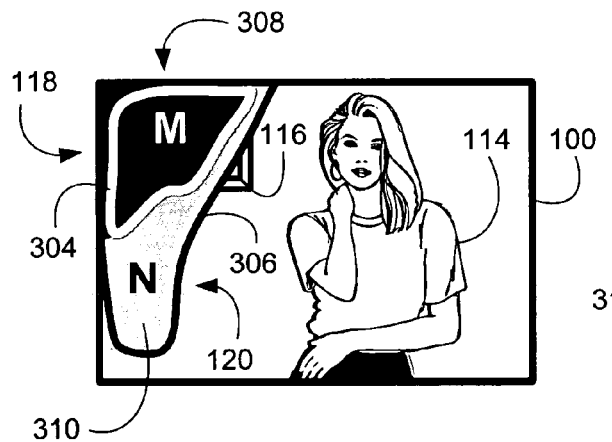
FIG. 3A is a simplified exemplary preview image with tone counter lines indicating regions having relatively low tone characteristics.

FIG. 3A is a simplified exemplary preview image 302 of a woman 114 and an underexposed picture 116. Preview image 302 corresponds to a current reading from the photosensor 410 of digital camera 202. Preview image 302 is displayed on display 428, and/or is viewable directly through viewfinder 422 (FIG. 4).

As apparent in the preview image 302, capturing an image of the woman 114 and the picture 116 may not result in a visibly pleasing image to some viewers since the picture 116 will be underexposed when captured. Accordingly, when the image is captured, detail of picture 116 will not be discernable to a viewer of the captured image. The picture 116 will be underexposed (zones 0-I) since the primary object of interest, the woman 114, is exposed at a middle gray tone setting.

Once the tone contour system 400 determines contour information of preview image 302, the contour information is communicated to the user. In one embodiment, contour information is displayed concurrently with preview image 302 using tone contour lines indicating transitions between the tone contour regions characterized by different predefined exposure values. For example, tone contour line 304 indicates a transition between a portion of preview image 302 at zone 0 (as indicated by a completely black region) and a portion at zone I. Similarly, tone contour line 306 indicates a transition between the above-described portion of the preview image 302 that is at zone I, and a portion of preview image 302 at zone II or higher.

In another embodiment, indicia are also displayed to further indicate tone contour regions of the preview image 302 that have similar tone characteristics. In the simplified illustrative example of the preview image 302, the letter "M" indicates a tone contour region 308 corresponding to that portion of the image, if captured without an exposure adjustment by embodiments of the tone contour system 400, will be underexposed at zone 0. The letter "N" indicates a tone contour region 310 corresponding to that portion of the image that will be underexposed at zone I. Any suitable indicia may be used, including Roman numerals that correspond to the zone system.

As noted above, tone contour regions may be shaded, textured and/or colored to further enhance the discernability of a tone contour region to the viewer. In one embodiment, the tone contour region 308 corresponding to zone 0 (completely black due to underexposure) is indicated by coloring the tone contour region in black or in another suitable warning color. Other tone contour regions, such as tone contour region 310, may be similarly colored with suitable warning colors.

Figure 3B:
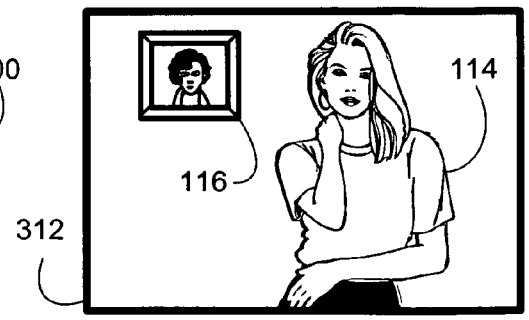
FIG. 3B is a simplified exemplary preview image of the woman centered in the preview image after the user has adjusted tone characteristics of the image as suggested by the tone contour lines.

FIG. 3B is a simplified exemplary captured image 312 of the woman 114 after image exposure has been adjusted based upon the contour information determined by the tone contour system 400. Accordingly, a captured image 312 displays the picture 116 with a relative greater amount of detail than in the preview image 302 (FIG. 3A).

In one embodiment, the user actuates the tone contour system 400 such that the exposure for those pixels corresponding to the identified tone contour regions is adjusted to a more desirable exposure and/or to a predetermined exposure. For example, one embodiment adjusts exposure of the tone contour region 308 (zone 0) to an exposure corresponding to another predefined zone, such as, but not limited to, zone I. Exposure of tone contour region 310 (zone I) is adjusted to an exposure corresponding to another predefined zone, such as, but not limited to, zone II. Exposure of tone contour regions may also be adjusted to fractional zone values.

In embodiments employing other tone indicia systems, the original exposure, zone and/or tone indicia is changed to an adjusted exposure, zone and/or tone indicia. In another embodiment, the user is able to specify the tones, zones or other tone indicia for a tone contour region, thereby enabling the user to change exposure of portions of the photosensor 410 based upon the tone contour information provided by the tone contour system 400. It is appreciated that the adjustment exposure for tone contour regions from an originally determined zone to another tone zone(s) is nearly limitless.

FIG. 4 is a block diagram illustrating an embodiment of a tone contour system 400 implemented in a digital camera 402. The present invention is equally applicable to any electronic device configured to capture images. For example, but not limited to, alternative embodiments include digital video cameras, film-based cameras, scanners, personal device assistants (PDAs), telephones, computers employing cameras, or other imaging systems wherein indicated contour information assists a user in tone composition of images.

FIG. 4 illustrates selected external and internal components of a digital camera 402 having an embodiment of the tone contour system 400. Selected internal components are illustrated between the cut-away lines 404a and 404b. The selected internal components include processor 406, memory 408, photosensor 410, and an optional exposure detector 412. In one embodiment, memory 408 further includes captured image data region 414 configured to store captured image data, and contour determination logic 416 configured to store logic that determines contour information of an image that is to be captured.

As described above, some embodiments determine the tone characteristics of the object of interest with a predefined portion 418 of photosensor 410. The pixels in the portion 418 detect light, and then processor 406 determines the detected light intensity. The portion 418 is located at a predefined area in the frame generally corresponding to a location where a user is expected to frame a primary object of interest into the captured image. Based upon the light detected by the portion 418, the image capture device 402 initially sets an exposure for all of the pixels of photosensor 410 such that when the pixels at the portion 418 capture light, that portion of the captured image exhibits tone that substantially corresponds to middle gray. That is, the exposure for the photosensor 410 is initially specified so that the pixels corresponding to the predefined point capture approximately 1800 of the incident light reflecting from the object.

In embodiments employing exposure detector 412, the exposure detector 412 is a photosensitive device that detects light intensity at a predefined point (or small area) in the frame generally corresponding to a location where a user is expected to frame an object of interest on the captured image. The detected light intensity is used to determine contour information. In other embodiments, the exposure detector may be another multi-function photosensitive device wherein a portion is used to detect light intensity to determine contour information. The exposure device may have a sufficient number of pixels to detect the initial exposure at various points across the entire frame of the image to be captured so that contour information can be determined from light detected by the exposure detector 412.

Selected external components of digital camera 402 include lens 420, viewfinder 422, shutter button 424, controller 426, display 428 and power switch 430. For convenience, display 428 is illustrated on the top of digital camera 402. In other embodiments, display 428 is located in another suitable location on the digital camera 402.

Operation of the digital camera 402 is initiated by actuation of the power switch 430 or an equivalent device having the same functionality. Photosensor 410 is disposed in a suitable location behind lens 420 such that an image of the object of interest may be focused onto photosensor 410 for capturing. In one embodiment, display 428 displays a view of an image currently visible through the lens 420 and detected by photosensor 410, referred to herein as a preview image.

Prior to capturing an image of the object of interest, the operator of the digital camera 402 visually previews the image of the object on display 428. Or, a view corresponding to the image of the object may be viewed directly through the viewfinder 422. Embodiments of the tone contour system 400 display the determined contour information on display 428 and/or display the contour information through the viewfinder 422.

Processor 406 retrieves and executes the contour determination logic 416. Data corresponding to the light intensity detected by portion 418, or by exposure detector 412, is analyzed by processor 406 to determine the initial tone, exposure level or other suitable indicia of the primary object of interest. Exposure for all pixels of photosensor are initially set based upon the exposure specified for the primary object of interest.

In one embodiment, light information is retrieved from all of the pixels of photosensor 410. The retrieved light information is analyzed by processor 406 to determine the amount of detected light, or exposure, for the pixels when their exposure is at the initially specified exposure for the primary object of interest.

In another embodiment, light information from selected pixels of photosensor 410 is retrieved and analyzed. Pixels are selected across the photosensor 410 such that exposure across the image can be approximated. Contour information is then determined from light information provided by the selected pixels. Accordingly, processing time is reduced when light information from the selected pixels is analyzed.

In embodiments having exposure detector 412 having a sufficient number of pixels to detect the initial exposure at various points across the entire frame of the image to be captured, light information from exposure detector 412 is used to determine the initial exposure of portions of the image. Contour information is then determined for the image based upon light information provided by the pixels of the exposure detector 412. Accordingly, processing time is reduced because light information from a relatively fewer number of pixels can be quickly retrieved and analyzed.

Contour information is determined by identifying pixels that have a similar exposure, or similar tone characteristics. That is, pixels detecting similar levels of light (similar exposure) are identified. Groups of adjacent pixels having similar exposure are used to define tone contour regions.

In one embodiment, pixels having an exposure within a predefined range of exposures are identified as pixels having similar exposure. For example, fully saturated or nearly fully saturated pixels, also referred to as fully exposed or nearly fully exposed pixels, are categorized by a suitable indicia, such as, but not limited to, zone X. For example, pixels that are between 100% saturated and 95% saturated may be categorized as having an exposure corresponding to zone X (or another suitable indicia). Accordingly, groups of adjacent pixels categorized as zone X define one or more tone contour regions having a tone corresponding to zone X (or another suitable indicia).

Similarly, other pixels having another similar exposure range are identified. Highly saturated pixels may be categorized by a suitable indicia, such as, but not limited to, zone IX. For example, pixels that are between 95% saturated and 90% saturated may be categorized as having an exposure corresponding to zone IX (or another suitable indicia). Accordingly, groups of adjacent pixels being classified as zone IX define one or more tone contour regions having a tone corresponding to zone IX (or another suitable indicia). Ranges may be broadened to encompass a greater range of exposure. For example, a tone contour region may be defined to have pixels which are categorized into zones IX and VIII.

Returning to the exemplary preview image of FIG. 2A, two contour regions 208 and 210 are identified. Tone contour region 208, in this simplified example, corresponds to a group of adjacent pixels categorized as zone X (or another suitable indicia), thereby indicating to the user that these pixels are fully or nearly fully saturated. Accordingly, if the preview image 202 is captured without tone adjustment made by embodiments of the tone contour system 400, that tone contour region of the captured image will appear as a white, or nearly totally white region. Similarly, tone contour region 210, in this example, corresponds to a group of adjacent pixels categorized as zone IX (or another suitable indicia), thereby indicating to the user that these pixels are highly saturated. Accordingly, if the preview image 202 is captured without tone adjustment, that tone contour region of the captured image will appear as a nearly totally white region with little visible detail.

In the above-described example of the contour information displayed concurrently with preview image 202 using tone contour lines 204 and 206, and tone contour regions 208 and 210, exposure in one embodiment is adjusted when the value of the light information received from pixels in a particular tone contour region is adjusted. The value of the light information may be decreased by subtracting a predefined value from the received light information, and/or may be scaled by a suitable predefined value. For example, the value of the light information from pixels in contour region 208 may be scaled by 90%. Thus, light information from a pixel that has a value corresponding to 100% exposure would be adjusted to a value corresponding to a 90% exposure level. Light information from a pixel that has a value corresponding to 97% exposure would be adjusted to a value corresponding to an 87.3% exposure level. Exposure may be adjusted, for example, using the method of U.S. Pat. No. 5,999,659 to Shimazu et al., or by other known processes of adjusting exposure of images captured by digital image capture devices.

For convenience, the initial exposure is defined herein to be the exposure (level of detected light) of pixels during image preview or of the pixels at the time of image capture (before exposure adjustment). The adjusted exposure is defined herein to be the adjusted exposure of light information from pixels used during image capture after light information from the pixels is adjusted by embodiments of the tone contour system 400.

Accordingly, the initial exposure, initial light information, initial zone and/or initial tone indicia is changed to an adjusted exposure, adjusted light value, adjusted zone and/or adjusted tone indicia, respectively, by multiplying the received light information by the predefined value of 90% in the above-described simplified example. It is appreciated that the adjustment of exposure for tone contour regions is nearly limitless.

When the user has focused the image of the object of interest, and is satisfied with the exposure of the image, the operator actuates the shutter button 424 to cause digital camera 402 to capture the image. Photosensor 410 detects the object of interest through lens 420 and communicates light information corresponding to the detected image to the processor 406. Data corresponding to the captured image is stored in the captured image data region 414 of memory 408, or in a suitable detachable memory 402 (not shown) coupled to the digital camera 402.

After exposure adjustment by embodiments of the tone contour system 400, the captured image when later displayed will show additional detail in the adjusted regions of the captured image. In the simplified example of FIG. 2A, the adjustments to tone contour regions 208 and 210 result in the captured image 212 of FIG. 2B, wherein additional detail of clouds 110 is discernable to the viewer of the image 212 (as contrasted with image 102 of FIG. 1A).

As described above, adjacent pixels having exposure within a predefined range are grouped into a contour zone. As another simplified illustrative example, unexposed or barely exposed pixels are characterized with a suitable indicia, such as, but not limited to, zone 0. For example, pixels that are between 0% exposed and 5% exposed may be categorized as having an exposure corresponding to zone 0 (or another suitable indicia). Accordingly, groups of adjacent pixels being categorized as zone 0 define a tone contour region having a tone corresponding to zone 0 (or another suitable indicia).

Similarly, other pixels having exposure within another predefined range are identified. For example, barely exposed pixels may be characterized with a suitable indicia, such as, but not limited to, zone II. For example, pixels that are between 5% exposed and 10% exposed may be categorized as having an exposure corresponding to zone II (or another suitable indicia). Accordingly, groups of adjacent pixels being classified as zone II define a tone contour region having a tone corresponding to zone II (or another suitable indicia). Ranges may be broadened to encompass a greater range of exposure. For example, a tone contour region may be defined to have pixels which are classified into zones II and III.

Returning to the exemplary preview image of FIG. 3A, two tone contour regions 308 and 310 are identified. Tone contour region 308, in this example, corresponds to a group of adjacent pixels categorized as zone 0 (or another suitable indicia), thereby indicating that these pixels are completely or nearly completely unexposed. Accordingly, if the preview image 302 is captured without tone adjustment made by embodiments of the tone contour system 400, that region of the captured image will appear as a black, or nearly totally black, region. Similarly, tone contour region 310, in this example, corresponds to a group of adjacent pixels classified into zone II (or another suitable indicia), thereby indicating to a user that these pixels are relatively underexposed. Accordingly, if the preview image 302 is captured without tone adjustment, that region of the captured image will appear as a gray region with little visible detail.

In the above-described example of the contour information displayed concurrently with preview image 302 using tone contour lines 304 and 306, and tone contour regions 308 and 310, embodiments of the tone contour system 400 adjust the exposure of pixels classified into the tone contour regions 308 and 310. In one embodiment, actual exposure of the pixels in a particular tone contour region is increased by a predefined amount of time. In another embodiment, the value of the light information received from pixels in a particular tone contour region is increased. The value of the light information may be increased by adding a predefined value to the received light information, and/or may be scaled by a suitable predefined value. For example, the initial value of the light information from pixels in tone contour region 308 may be increased by 10%. Thus, light information from a pixel that has an initial value corresponding to 0% exposure would be adjusted to a 10% exposure. Light information from a pixel that has an initial value corresponding to 3% exposure would be adjusted to a 13% exposure.

Figure 1B:
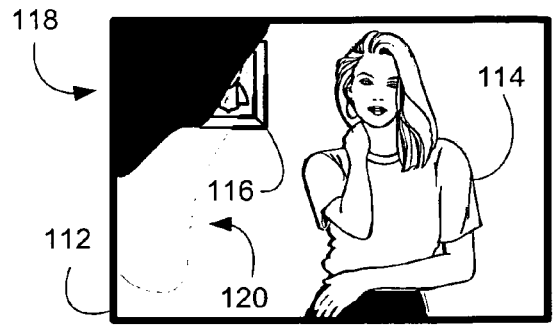
FIG. 1B is a simplified exemplary high contrast captured portrait image of a woman in a background.

After exposure adjustment by embodiments of the tone contour system 400, the captured image when later displayed will show additional detail in the adjusted regions of the captured image. In the simplified example of FIG. 3A, the exposure adjustments made to tone contour regions 308 and 310 result in the captured image 312 of FIG. 3B, wherein additional detail of picture 116 is discernable to the viewer of the image 312 (as contrasted with image 112 of FIG. 1B).

Embodiments employing the controller 426 allow a user to selectively activate the tone contour system 400. When actuated, the tone contour system 400 displays the contour information to the user. If not actuated, the image capture device captures the image using light information at the initial exposure. In other embodiments, activation of the tone contour system 400 is implemented as a selectable feature on a menu system or the like.

Some of the above-described embodiments of the tone contour system 400 adjust the exposure of pixels categorized into the tone contour regions by adjusting the exposure value of light information received from pixels in photosensor 410. That is, the raw data received from the pixels of photosensor 410 are adjusted before image compression. Thus, a voltage level or a value corresponding to a voltage level from an individual pixel may be adjusted.

Other embodiments adjust light information at other points in the data processing pipeline. For example, but not limited to, light information from a plurality of pixels may be processed into data having eight (8) bits or sixteen (16) bits representing red, blue and green color intensities detected by that group of pixels. Accordingly, portions of the 8 bit or 16 bit data are adjusted by embodiments of the tone contour system 400.

In one embodiment, captured image data is communicated to the memory 408 from processor 406, and stored in the captured image data region 414. In another embodiment, digital image data is transferred to a detachable memory (not shown) or a remote memory (not shown). During later stages of image data processing, selected information may be saved to reduce the amount of memory used for storing captured image data. For example, if a less detailed image is acceptable, the user may instruct the digital camera 402 to store images using a smaller data file size. In one such embodiment, light information from relatively large groups of pixels are averaged together into a single light information value. In other embodiments, some light information is retained while other light information is discarded. After such processing, embodiments of the tone contour system 400 may then adjust the image data such that overexposed and/or underexposed portions of an image are adjusted.

As another example, contour information may be determined from compressed Joint Experts Photographics Group (JPEG) formatted data, and then the JPEG data may be adjusted such that overexposed and/or underexposed portions of an image are adjusted. It is appreciated that any form of data file or data format may be processed such that image data is adjusted by embodiments of the tone contour system 400 such that overexposed and/or underexposed portions of an image are adjusted.

Figure 5:
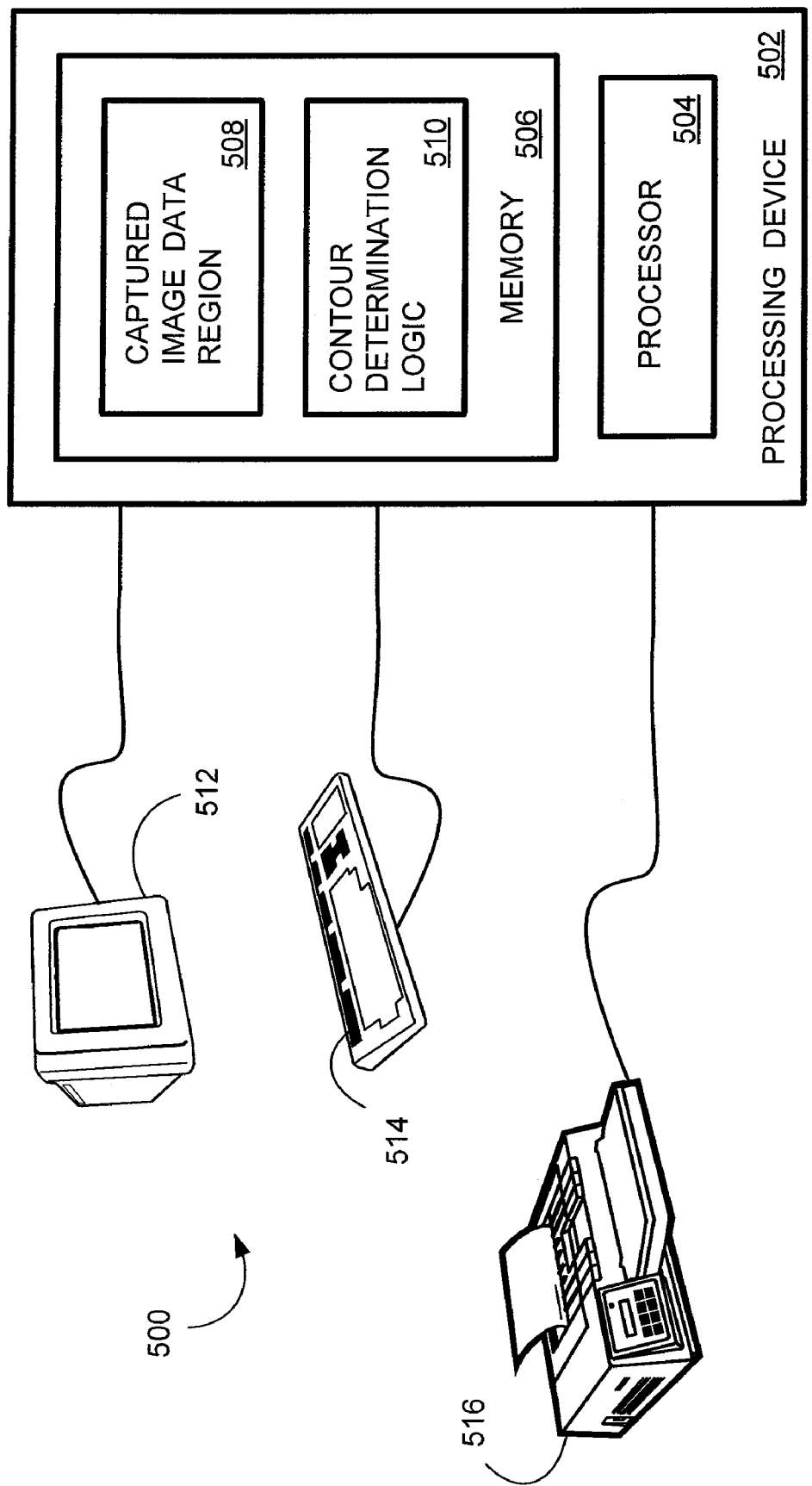
FIG. 5 is a block diagram illustrating an embodiment of a tone contour system implemented in a processing device.

In yet another embodiment, captured image data is transferred to another processing device such that an embodiment of the tone contour system 400 adjusts overexposed and/or underexposed portions of an image. FIG. 5 is a block diagram illustrating an embodiment of a tone contour system 500 implemented in a processing device 502.

Tone contour system 500 illustrated in FIG. 5 is implemented in processing device 502. One embodiment is a personal computer. Another embodiment is a laptop computer. Processing device 502 includes a processor 504 and memory 506. Captured image data is stored in the captured image data region 508 of memory 506. When the contour determination logic 510 is executed by processor 504, the initial exposure values of a captured image are analyzed to determine contour information as described herein. The contour information is displayed with the captured image on display 512. The user may then have the processing device 502 adjust the exposure of the captured image as described herein. Instructions may be provided by the user via keyboard 514 or another suitable interface device. After exposure adjustment, an image with adjusted exposure (tones) may be printed on printing device 516 or viewed on display 512.

As described above, light information from a plurality of pixels is analyzed to determine groups of pixels having similar exposure, thereby determining tone contour regions. In another embodiment, an algorithm identifies coarse exposure attributes of the preview image. The coarse exposure attributes are analyzed using a plurality of coarse grids to identify an average exposure for the grids. Grids having similar average exposure levels, or exposure levels within a predefined common range, are grouped to define tone contour regions as described above. Accordingly, this embodiment of the tone contour system 500 may more quickly determine and display contour information for a preview image.

In one embodiment, the tone contour system 400 is implemented in digital camera 402 as a selectable feature. Controller 426 is configured such that actuation of controller 426 enables or disables the operation of the tone contour system 400. Examples of controller 426 include, but are not limited to, a push-button, a toggle-switch, a multi-position sensing device configured to sense a plurality of positions, a touch sensitive device or a light sensitive device. In another embodiment, the functionality of controller 426 may be alternatively implemented as a menu displayed on display 428.

In one embodiment, viewfinder 422 is an optical based device configured to align the view of the user with the image sensed by photosensor 410. The contour information is then displayed within viewfinder 422 concurrently with a view of the preview image using a heads-up display device or other similarly suited display means. In another embodiment, viewfinder 422 includes a relatively small electronic display that resides within the viewfinder 422. The display residing in the viewfinder 422 is configured to display the image sensed by photosensor 410. Another embodiment may employ its own photosensor element that is aligned with photosensor 410.

Figure 6:
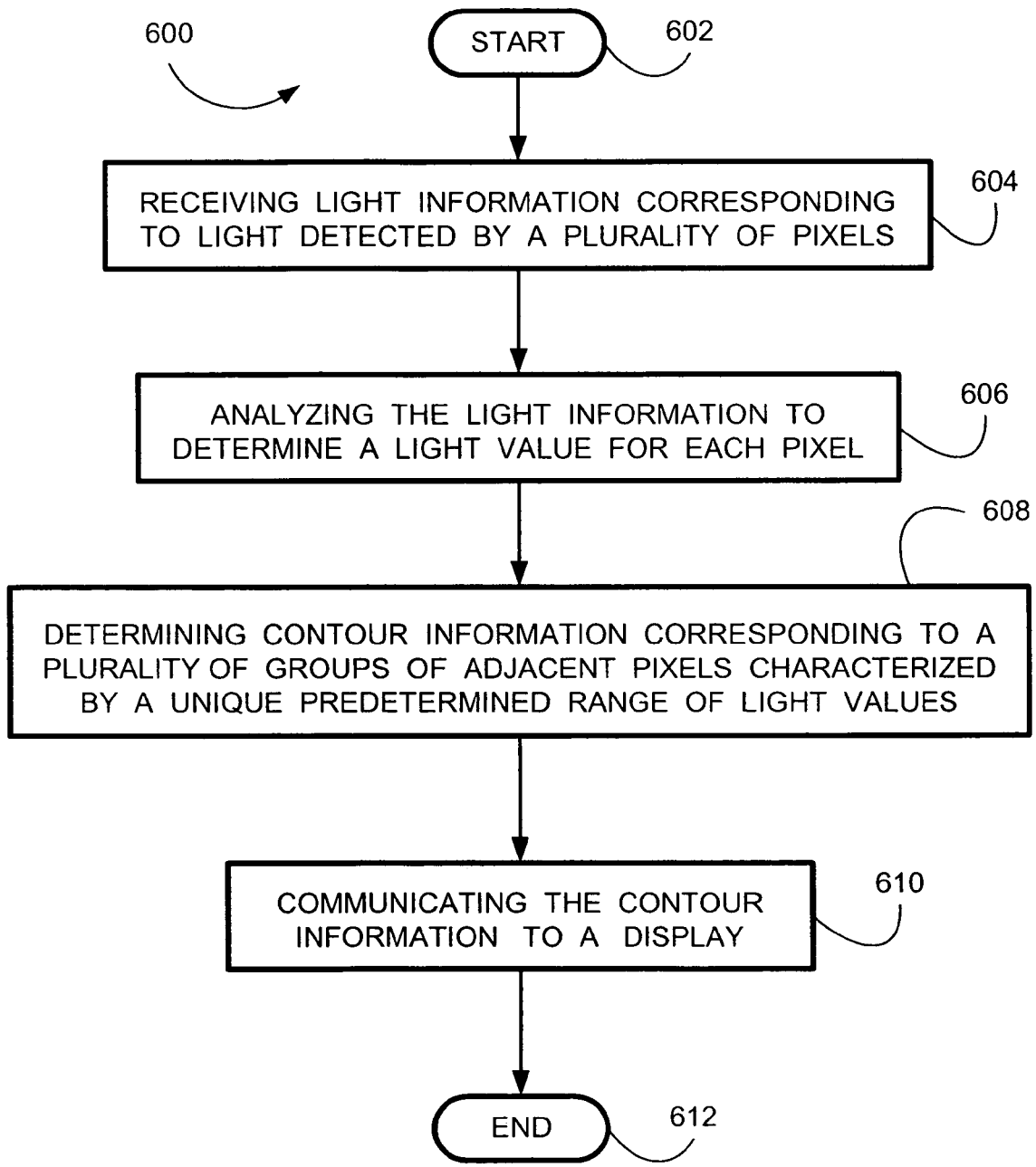
FIG. 6 shows a flow chart illustrating a process for an embodiment of the tone contour system.

FIG. 6 shows a flow chart 600 illustrating a process for an embodiment of the tone contour system 400 (FIG. 4). The flow chart 600 shows the architecture, functionality, and operation of an embodiment for implementing the contour determination logic 416 (FIG. 4) such that contour information assists the user in composing tone of an image. An alternative embodiment implements the logic of flow chart 600 with hardware configured as a state machine. In this regard, each block may represent a module, segment or portion of code, which comprises one or more executable instructions for implementing the specified logical function(s). It should also be noted that in some alternative implementations, the functions noted in the blocks may occur out of the order noted in FIG. 6, or may include additional functions. For example, two blocks shown in succession in FIG. 6 may in fact be substantially executed concurrently, the blocks may sometimes be executed in the reverse order, or some of the blocks may not be executed in all instances, depending upon the functionality involved, as will be further clarified hereinbelow. All such modifications and variations are intended to be included herein within the scope of the present invention.

The process begins at block 602. At block 604, light information corresponding to light detected by a plurality of pixels is received. At block 606, light information to determine a light value for each of the plurality of pixels is analyzed. At block 608, contour information corresponding to a plurality of groups of adjacent pixels, wherein each group of adjacent pixels is characterized by a unique predetermined range of light values, is determined. At block 610, the contour information is communicated to a display. The process ends at block 612.

Embodiments of the invention implemented in memory 408 (FIG. 4) or memory 506 (FIG. 5) may be implemented using any suitable computer-readable medium. In the context of this specification, a "computer-readable medium" can be any means that can store, communicate, propagate, or transport the data associated with, used by or in connection with the instruction execution system, apparatus, and/or device. The computer-readable medium can be, for example, but not limited to, an electronic, magnetic, optical, electromagnetic, infrared, or semiconductor system, apparatus, device, or propagation medium now known or later developed.

It should be emphasized that the above-described embodiments are merely examples of implementations. Many variations and modifications may be made to the above-described embodiments. All such modifications and variations are intended to be included herein within the scope of this disclosure and protected by the following claims.

Therefore, having thus described the invention, at least the following is claimed:

1. A method implemented in an image capture device, the method for assisting in tone composition of an image, the method comprising the steps of:
   receiving light information corresponding to light detected by a plurality of pixels of a photosensor in the image capture device;
   analyzing the light information to determine a light value for each of the plurality of pixels, the light value corresponding to an adjustable exposure level;
   determining contour information, the contour information corresponding to a plurality of groups of adjacent pixels, wherein each group of adjacent pixels is characterized by a unique predetermined range of light values, the contour information comprising tone contour regions and tone contour lines;
   communicating the contour information to a display of the image capture device;
   displaying the tone contour regions and the tone contour lines concurrently with the image prior to image capture, the tone contour lines indicating a transition between a first exposure level of a first tone contour region and a second exposure level of a second tone contour region; and
   adjusting prior to image capture at least one of the first exposure level and the second exposure level based on the contour information, wherein the step of adjusting further comprises:
   adjusting the received light information from a first group of adjacent pixels from an initial value to an adjusted value such that the adjusted light information for the first group is adjusted to an adjusted predetermined range of light values; and
   adjusting a zone of the first group of adjacent pixels from an initial zone to an adjusted zone, the initial zone corresponding to an indicia indicating the unique predetermined range of light values and the adjusted zone corresponding to an adjusted indicia indicating an adjusted unique predetermined range of light values.

2. The method of claim 1, wherein the step of displaying further comprises the step of displaying the tone contour regions with a warning color.

3. The method of claim 1, wherein the step of displaying further comprises the step of displaying the tone contour regions with an indicia.

4. The method of claim 1, wherein the step of displaying further comprises the step of displaying the tone contour regions with an indicia corresponding to a zone.

5. The method of claim 1, further comprising the step of adjusting the received light information from a second group of adjacent pixels from a second initial value to a second adjusted value such that the adjusted light information for the second group is adjusted to a second adjusted predetermined range of light values.

6. The method of claim 1, wherein the step of adjusting further comprises the step of adjusting exposure of the first group of adjacent pixels from an initial exposure to an adjusted exposure.

7. The method of claim 1, wherein the step of adjusting further comprises the step of adjusting a tone of the first group of adjacent pixels from an initial tone to an adjusted tone, the initial tone corresponding to an initial indicia indicating the unique predetermined range of light values and the adjusted tone corresponding to an adjusted indicia indicating an adjusted unique predetermined range of light values.

8. The method of claim 1, wherein the step of receiving the light information further comprises the step of receiving the light information from the photosensor.

9. The method of claim 1, further comprising the steps of:
   determining the contour information from the light information received from an exposure detector;
   correlating the determined contour information with the light information from the photosensor;
   identifying groups of adjacent pixels of the photosensor, each group of adjacent pixels characterized by the unique predetermined range of light values corresponding to the contour information; and
   wherein adjusting further comprises adjusting a portion of the light information for at least one group of adjacent pixels from an initial value to an adjusted value such that the adjusted light information is adjusted to a second predetermined range of light values.

10. The method of claim 9, further comprising the steps of capturing the image with the adjusted light information.

11. The method of claim 1, further comprising the steps of:
    determining the contour information for a group of adjacent pixels that are overexposed; and
    displaying the contour information for the overexposed pixels as a tone contour region with an indicia indicating an overexposed condition.

12. The method of claim 1, further comprising the steps of:
    determining the contour information for a group of adjacent pixels that are underexposed; and
    displaying the contour information for the underexposed pixels as a tone contour region with an indicia indicating an underexposed condition.

13. A digital camera that assists in tone composition of an image, comprising:
    a photosensor of the digital camera, the photosensor comprising a plurality of pixels that detect light;
    a processor that receives light information from the plurality of pixels, that analyzes the light information to determine a light value for each of the plurality of pixels and that determines contour information, the contour information corresponding to a plurality of groups of adjacent pixels, wherein each group of adjacent pixels is characterized by a unique predetermined range of light values, the light value corresponding to an exposure level; and a display configured to display the contour information and a preview image, the preview image comprising the image detected before image capture, the contour information comprising tone contour regions and tone contour lines, the tone contour lines indicating a transition between a first exposure level of a first contour region and a second exposure level of a second contour region;

wherein the processor is further configured to adjust at least one of the first exposure level and the second exposure level based on the contour information, wherein the processor is further configured to:

adjust the received light information from a first group of adjacent pixels from an initial value to an adjusted value such that the adjusted light information for the first group is adjusted to an adjusted predetermined range of light values;

determine an adjusted tone contour line, the adjusted tone contour line corresponding to a transition between the first group of adjacent pixels characterized by the adjusted predetermined range of light values and another group of adjacent pixels characterized by a unique other predetermined range of light values; and display the adjusted tone contour line concurrently with the image.

14. The digital camera of claim 13, further comprising an exposure detector that communicates detector light information to the processor wherein the contour information is determined from the received detector light information.

15. The digital camera of claim 13, further comprising a viewfinder configured to display the contour information and the preview image.

16. A method implemented in an image capture device, the method for assisting in tone composition of an image, the method comprising the steps of:

receiving light information corresponding to light detected by a plurality of pixels of a photosensor in the image capture device;

analyzing the light information to determine a light value for each of the plurality of pixels, the light value corresponding to an adjustable exposure level;

determining contour information, the contour information corresponding to a plurality of groups of adjacent pixels, wherein each group of adjacent pixels is characterized by a unique predetermined range of light values, the contour information comprising tone contour regions and tone contour lines;

communicating the contour information to a display of the image capture device;

displaying the tone contour regions and the tone contour lines concurrently with the image prior to image capture, the tone contour lines indicating a transition between a first exposure level of a first tone contour region and a second exposure level of a second tone contour region;

adjusting prior to image capture at least one of the first exposure level and the second exposure level based on the contour information, wherein the step of adjusting further comprises adjusting the received light information from a first group of adjacent pixels from an initial value to an adjusted value such that the adjusted light information for the first group is adjusted to an adjusted predetermined range of light values;

determining an adjusted tone contour region, the adjusted tone contour region corresponding to the first group of adjacent pixels characterized by the adjusted predetermined range of light values; and displaying the adjusted tone contour region concurrently with the image.

* * * * *

UNITED STATES PATENT AND TRADEMARK OFFICE
CERTIFICATE OF CORRECTION

| | | |
|---|---|---|
| PATENT NO. | : 7,397,968 B2 | Page 1 of 1 |
| APPLICATION NO. | : 10/696328 | |
| DATED | : July 8, 2008 | |
| INVENTOR(S) | : Donald J. Stavely et al. | |

It is certified that error appears in the above-identified patent and that said Letters Patent is hereby corrected as shown below:

On sheet 1 of 4, in Fig. 3A, delete tag "100" and insert -- 302 --, therefor.

In column 7, line 43, delete "1800" and insert -- 18% --, therefor.

Signed and Sealed this

Twelfth Day of May, 2009

JOHN DOLL
*Acting Director of the United States Patent and Trademark Office*